(12) United States Patent
Ryu

(10) Patent No.: US 7,210,746 B2
(45) Date of Patent: May 1, 2007

(54) CAR WHEEL COVER

(76) Inventor: Chung-sub Ryu, 109-230, Mansu-3dong, Namdong-gu, 405-243, Incheon (KR)

( * ) Notice: Subject to any disclaimer, the term of this patent is extended or adjusted under 35 U.S.C. 154(b) by 99 days.

(21) Appl. No.: 10/484,725

(22) PCT Filed: Jul. 23, 2002

(86) PCT No.: PCT/KR02/01383

§ 371 (c)(1),
(2), (4) Date: Jun. 7, 2004

(87) PCT Pub. No.: WO03/010010

PCT Pub. Date: Feb. 6, 2003

(65) Prior Publication Data

US 2004/0232759 A1    Nov. 25, 2004

(30) Foreign Application Priority Data

Jul. 24, 2001  (KR) ............................ 2001-22425 U

(51) Int. Cl.
*B60B 7/04* (2006.01)
*G09F 21/04* (2006.01)

(52) U.S. Cl. ............................ 301/37.25; 301/37.109; 40/587

(58) Field of Classification Search ........... 301/37.101, 301/37.25, 37.109, 37.42, 37.26; 40/587, 40/439, 440
See application file for complete search history.

(56) References Cited

U.S. PATENT DOCUMENTS

| 4,280,293 | A | * | 7/1981 | Kovalenko et al. | ........... 40/587 |
| 4,388,771 | A | * | 6/1983 | Lalonde | ........... 40/587 |
| 4,929,030 | A | * | 5/1990 | Park | ........... 301/37.25 |
| 6,637,831 | B1 | * | 10/2003 | Kim | ........... 301/37.25 |
| 6,848,751 | B1 | * | 2/2005 | Yuan | ........... 301/37.25 |

* cited by examiner

*Primary Examiner*—Jason R. Bellinger
(74) *Attorney, Agent, or Firm*—Bacon & Thomas PLLC

(57) ABSTRACT

A wheel mountable car wheel cover provides a design element that is visible while the wheel is rotated. A circular rotation case has a liquid filled floating chamber. A bearing for mounting the rotation case to a wheel is provided on the rotation case. A disk-type design plate is disposed floating in the floating chamber, and a weight disposed on a lower side of the design plate causes the design plate to remain in a stable, upright position despite rotation of the rotation case. A surface of the rotation case is transparent such that a surface of the design plate is visible through the surface of the rotation case. Thus, a picture or logo disposed on the surface of the design plate is visible through the surface of the rotation case. In one embodiment, the rotation case is disposed within a protection case which is mountable on a wheel.

2 Claims, 3 Drawing Sheets

CAR WHEEL COVER

FIELD OF THE INVENTION

The invention relates to a car wheel cover having a design plate that is settled in the original position during driving so that it achieves a desired decoration effect or advertisement effect by the design plate.

BACKGROUND OF THE INVENTION

Conventionally, a car has been used as a transportation means. However, the car is recently regarded as a means that shows the individuality or social status of the owner.

Accordingly, many car companies are developing a car with various and unique designs in order to satisfy the consumer's various desires. Even the wheels of the car are made in various designs and materials in order to satisfy the customer's desire.

However, as the car is running, the wheels are rotated accordingly and the design or the shape of the wheels may not be recognized at all. Therefore, a means or method is desired to have the decorated wheel recognized.

In order to achieve the above purpose, a car wheel cover has been devised comprising a design plate which is rotatively mounted at the wheel and has a weight at the lower side whereby the design plate is not rotated, but remains settled in an original position although the wheel of the car is rotated. (Korean Patent Application No. 1999-021972)

The above design plate is rotatively mounted at the wheel by means of a bearing, or is inserted into a case filled with liquid and floated in the case by buoyancy of the liquid. Accordingly, the design plate does not rotate along with the wheel because the weight is attached at the lower side causing the design plate to remain settled in the original position even though the car is running.

In a wheel cover comprising the design plate mounted at the wheel by means of a bearing, the design plate may remain settled in the original position when the car is running at a constant speed along a plane and smooth road which has no bump. However, when the car is accelerated or decelerated rapidly or when the car is running on a bumpy road, an eccentrical force may be applied to the design plate due to the weight so that the above design plate may be excessively shaken or may be swung repeatedly, resulting in rotational movement of the design plate, so that the design of the design plate may not be recognizable.

Further, in a wheel cover comprising a design plate which is floated in the case by buoyancy of liquid, when the case is rotated below a certain speed, the liquid in the case may be kept in static condition so that the liquid absorbs a movement energy generated by the acceleration and deceleration of the car or the shaking of the car. Accordingly, the design plate remains settled in the original position by the weight at the lower side.

However, when the case is rotated over a critical speed, or over a speed such that the liquid is unable to absorb the rotation speed of the case, the liquid will be rotated together with the case so that the design plate floated by the liquid is also rotated along with the wheel. According to tests and observation, the design plate will rotate together with the case when the car is driven over the speed of 80 km per hour. This may be illustrated by way of example, wherein, if water and laundry are put into a cylindrical washing barrel of a washing machine, and the washing barrel rotated, the water and the laundry rotate together with the washing barrel.

Accordingly, if the car is driven below a certain critical speed, compared with said wheel cover utilizing the bearing, the wheel cover utilizing buoyancy of the liquid may better allow the design plate to remain settled in the original position without being affected by vibration, acceleration and deceleration of the car. However, the above wheel cover has also the problem that, if the car is running over a critical speed, the design plate will rotate with the wheel so that a logo or picture of the design plate cannot be recognized.

SUMMARY OF THE INVENTION

The present invention solves the above described problems and so the object of the invention is to provide a car wheel cover having a design plate that remains settled in an original position although the wheel is rotated, so that a decoration effect or advertisement effect of the design plate is achieved even while the wheel rotates.

According to an aspect of the invention, there is provided a car wheel cover comprising a circular rotation case 8, 10 which has a floating chamber filled with liquid and is rotatively mounted on a wheel 6 by means of a bearing 4. A disk type design plate 12, 14 is floated in the floating chamber 2 of the rotation case 8, 10 and is provided with a weight 16 at a lower side. A variety of pictures and logos may be formed on the surface of the design plate 12, 14, and the surface of the rotation case 8, 10 is made of transparent material in order that the pictures or the logos of the design plate 12, 14 may be seen, through the surface of the rotation case.

According to another aspect of the invention, there is provided a car wheel cover wherein a protection case 18, 20 which has a insertion space 22 is fixed at the front surface of the wheel 6. A rotation shaft 28 is mounted at the center of the protection case 18, 20 so that the rotation case 8, 10, mounted to the rotation shaft 28 by means of the bearing 4, may be protected within the protection case 18, 20.

DETAILED DESCRIPTION OF THE INVENTION

A preferred embodiment of the invention will be described in detail below by referring to the accompanying drawings.

Figure 1:
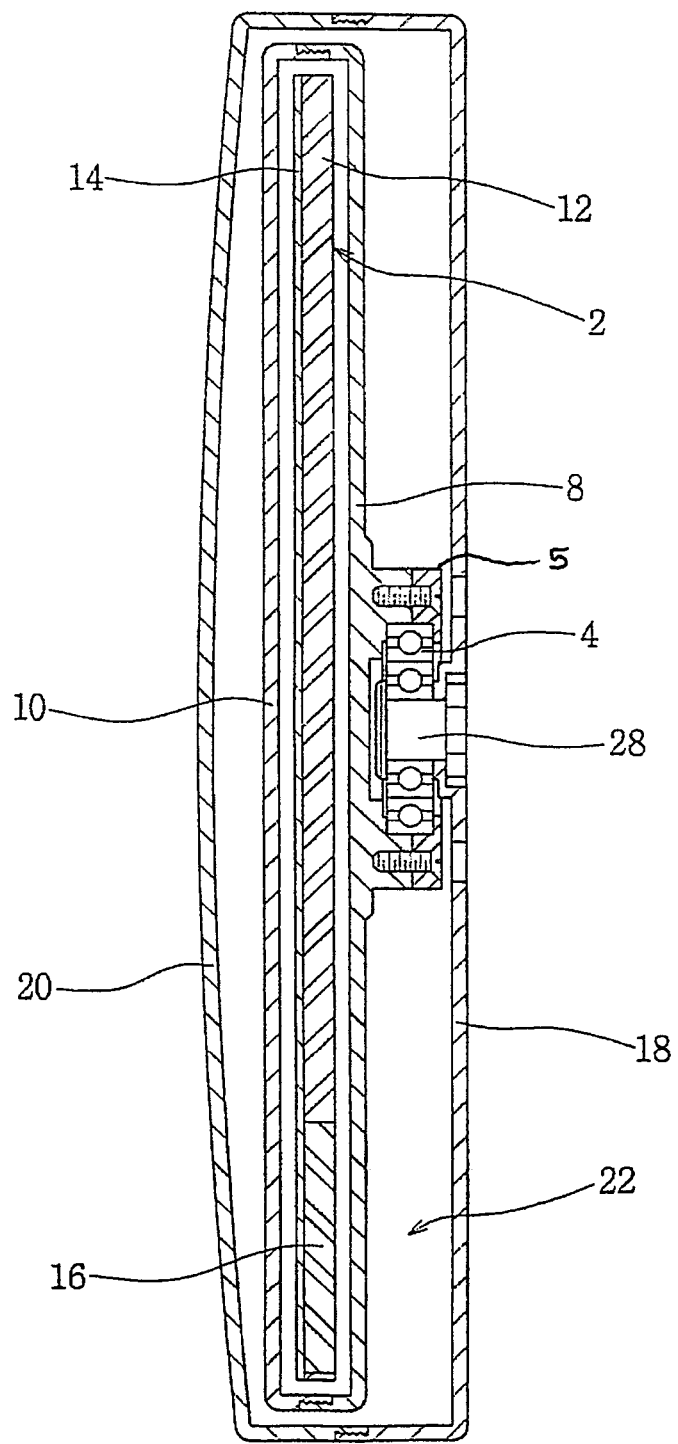
FIG. 1 is a sectional side view of a car wheel cover according to the invention.
Figure 2:
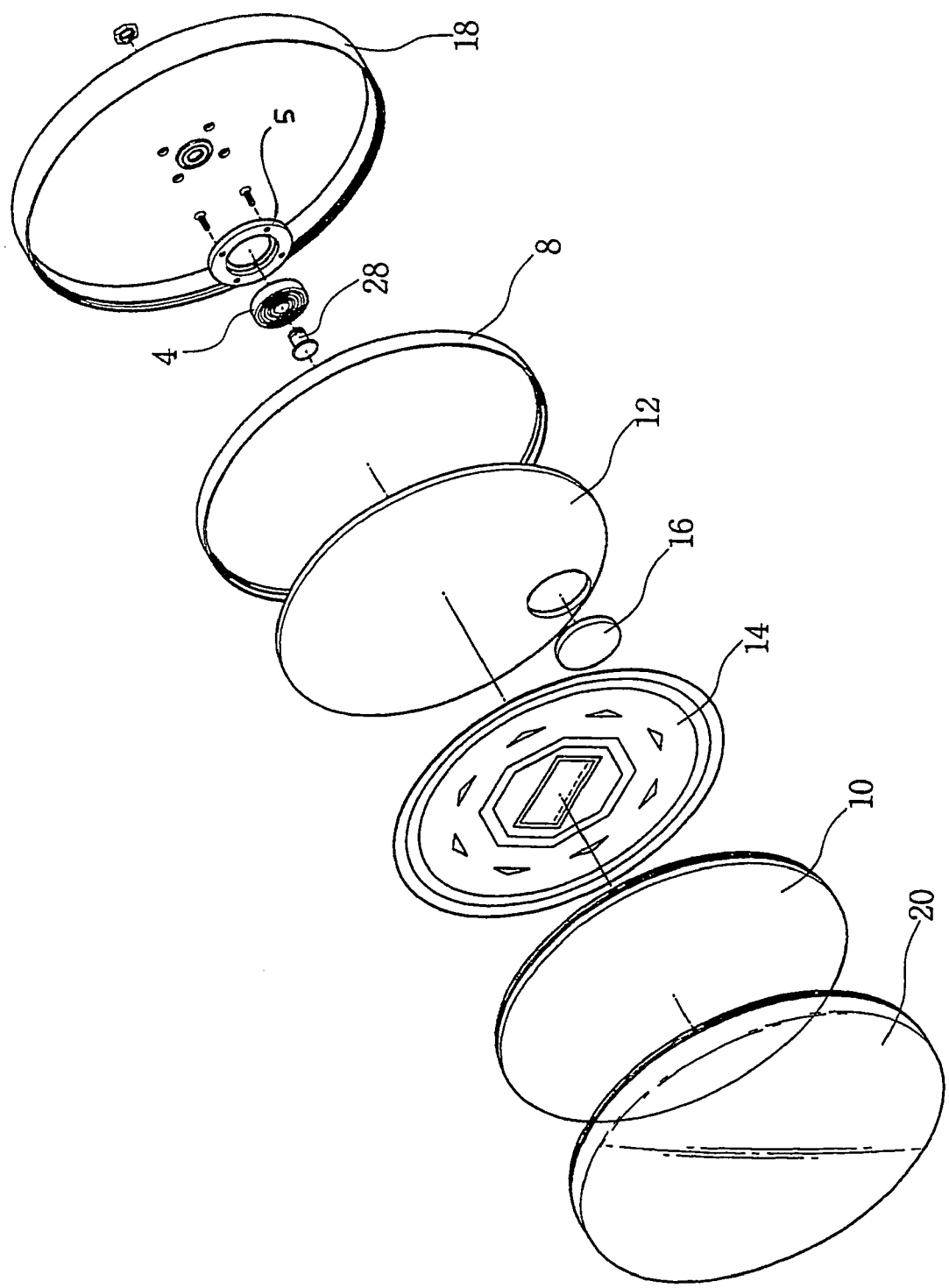
FIG. 2 is an exploded perspective view of the car wheel cover.
Figure 3:
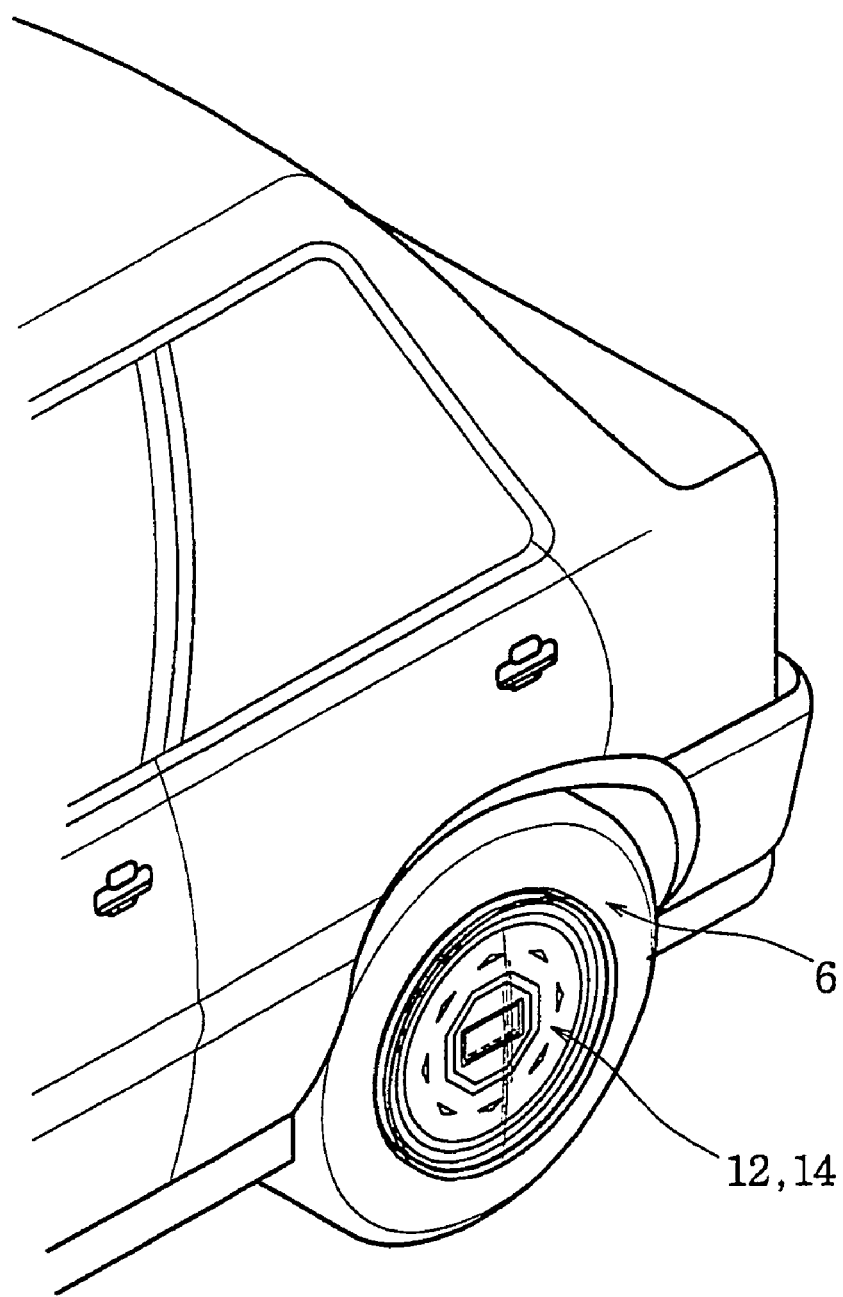
FIG. 3 is a view of the car wheel cover of the invention.

FIG. 1 to FIG. 3 show the embodiments according to the invention. As shown in the drawings, the car wheel cover of the invention comprises a circular rotation case 8, 10 which has a floating chamber filled with liquid and is rotatively mounted at a wheel 6 by means of a bearing 4, and a disk type design plate 12, 14 which is inserted into the floating chamber 2 of the rotation case 8, 10. In an illustrated configuration, bearing 4 is retained on a back side of rotation case body 8 by a flange 5.

The rotation case 8, 10 is formed as a circular plate, and is made with a case body 8 whose front surface is opened and a cover 10 which is combined at the front surface of the case body 8. Accordingly, a user may assemble the rotation case 8, 10 by combining the case body 8 and the cover 10 each other. The bearing 4 is mounted at the rear surface of the case body 8.

The cover 10 is formed of a transparent plastic material so that the design plate 12, 14 mounted at the inside of the rotation case 8, 10 is visible with eye. The liquid filled in the rotation case 8, 10 should be oil or antifreezing solution whose viscosity is low and whose material properties are not changed by heat.

The design plate 12, 14 includes a plastic disk 12 and a design sheet 14 which has any of a variety of logos, pictures or figures and is attached at the front surface of the disk 12. A metal weight 16 is mounted at the lower side of the disk 12. Further, the design plate 12, 14 has a weight such that the design plate 12, 14 may be floated by buoyance of the liquid in the rotation case 8, 10. Accordingly, the design plate 12, 14 remains settled in the original upright position because it is floated in the rotation case 8, 10.

The rotation case 8, 10 is mounted in the protection case 18, 20 fixed at the wheel 6. The diameter of the protection case 18, 20 is larger than that of the rotation case 8, 10 and an insertion space 22 is formed so that the rotation case 8, 10 is inserted into the insertion space 22. The protection case 18, 20 includes an inner case 18 which is fixed at the wheel 6 by means of bolts (not shown) and an outer case 20 which is combined with the inner case 18. A rotation shaft 28 is coaxial to the wheel 6 and is projected at the center of the inner case 18. Accordingly, the user may mount the rotation case 8, 10 rotatively in the protection case 18, 20 by combining the bearing 4 of the rotation case 8, 10 with the rotation shaft 28. Here, because the outer case 20 of the protection case 18, 20 is made in a transparent plastic, the rotation case 8, 10 and the design plate 12, 14 in the rotation case 8, 10 are visible.

Accordingly, a user may mount the rotation case 8, 10 in the protection case 18, 20 by mounting the inner case 18 of the protection case 18, 20 at the wheel 6 and by combining the rotation case 8, 10 to the rotation shaft 28 of the inner case 18 and finally by mounting the outer case 20 at the front surface of the inner case 18.

The car wheel cover according to the invention comprises a rotation case 8, 10 which is rotatively mounted at the wheel 6 and a design plate 12, 14 which is mounted in the rotation case 8, 10. Here, the design plate 12, 14 is floated in the liquid filled in the floating chamber 2 of the rotation case 8, 10 whereby shake of the design plate 12, 14 is calmed down, or damped, promptly when the design plate 12, 14 is shaken. Further, the liquid in the rotation case 8, 10 prevents shake and the repeated swinging of the design plate 12, 14 by absorbing the movement energy generated as the rotation case 8, 10 is rotated or vibrated so that the rotation case 8, 10 is hardly rotated. The center of the rotation case 8, 10 should be mounted at the center of the wheel 6 in order that an eccentrical force is not applied to the rotation case 8, 10.

Accordingly, because the rotation case 8, 10 is hardly rotated although the wheel 6 is rotated at a high speed, the liquid filled in the floating chamber 2 of the rotation case 8, 10 is kept in a static condition so that the design plate 12, 14 floated in the floating chamber 2 is hardly rotated. Although the car is accelerated and decelerated rapidly or is driven on a bumpy road and the wheel is vibrated, the liquid absorbs the vibration so that the design plate 12, 14 is hardly rotated or shaken. And, because the design plate 12, 14 is hardly rotated or shaken, the logos or figures of the design plate 12, 14 remain clearly visible even when the car is driven or accelerated and decelerated, so that the visual effect of the design plate may be increased remarkably.

According to the car wheel cover of the invention, because the center of the design plate 12, 14 is eccentric owing to the weight 6 but the center of the rotation case 8, 10 is not eccentric, the rotation case 8, 10 is not vibrated severely although the car is driven at a high speed and is accelerated and decelerated or is driven on a bumpy road. However, the rotation case 8, 10 is rotatively mounted at the wheel by means of the bearing 4 so that the rotation case 8, 10 is inevitably vibrated more or less.

Although the rotation case 8, 10 is vibrated more or less, because the liquid is filled in the rotation case 8, 10 and the design plate 12, 14 having the weight 16 is floated in the liquid, even when the design plate 12, 14 is about to be vibrated with the rotation case 8, 10, the liquid generates resistance and promptly prevents the vibration of the design plate 12, 14. And, although the car is driven on a bumpy road, the liquid absorbs the shock and controls the vibration of the design plate 12, 14. Further, the rotation or the vibration of the case 8, 10 may also be prevented by the weight of the liquid.

Further, because the rotation case 8, 10 is mounted in the protection case 18, 20 which is mounted at the center of the wheel 6 by means of the rotation shaft 28, the rotation case 8, 10 and the bearing 4 are protected from pollution or damage caused by dirt or alien material.

In the illustrated embodiment, the design plate 12, 14 is comprised with a design sheet 14 at the front surface of the disk 12. However, it is possible that a variety of pictures or logos may be molded at the front surface of the disk 12. Further, it is also possible that a variety of advertisement sentences or advertisement pictures may be disposed on the design plate 12, 14 in order that an advertising effect may be achieved.

Further, formation of a variety of projections on the inner wall of the floating chamber 2 of the rotation case 8, 10 or at the circumference surface of the design plate 12, 14, reduces the shake of the liquid by a strong resistance generated between the projections and the liquid so that the vibration of the design plate 12, 14 may be promptly calmed down although the design plate 12, 14 is vibrated.

Therefore, because the car wheel cover of the invention comprises a rotation case 8, 10 which is rotatively mounted at the wheel 6 by means of a bearing 4, and a design plate 12, 14 which is disposed in the floating chamber 2 of the rotation case 8, 10, the design plate 12, 14 does not rotate but remains settled in the original position independent of vibration or acceleration and deceleration of the car.

The invention claimed is:

1. A car wheel cover, comprising:
    a circular rotation case having a floating chamber filled with a liquid, the rotation case having a bearing for mounting the rotation case to a wheel;
    a disk-type design plate floated in the floating chamber; and
    a weight disposed on a lower side of the design plate;
    wherein a surface of the rotation case is made of a transparent material such that a surface of the design plate is visible through the surface of the rotation case;
    whereby a picture or logo disposed on the surface of the design plate is visible through the surface of the rotation case.

2. The car wheel cover according to claim 1, further comprising:
    a protection case configured to be fixed to a front surface of said wheel, the protection case having an insertion space; and
    a rotation shaft disposed at the center of the protection case;
    wherein said rotation case is contained within the insertion space of said protection case whereby said rotation case is protected by said protection case; and
    wherein said rotation case is mounted to said rotation shaft by said bearing.

* * * * *